United States Patent Office 3,705,046
Patented Dec. 5, 1972

---

3,705,046
STARCH PRODUCT
Edwin L. Speakman, Clinton, Iowa, assignor to Standard Brands Incorporated, New York, N.Y.
No Drawing. Filed Jan. 18, 1971, Ser. No. 107,510
Int. Cl. C08b 27/22
U.S. Cl. 106—213          20 Claims

ABSTRACT OF THE DISCLOSURE

The disclosure is directed to modified cross-linked starch products in the granular form. Pastes of these starch products have substantially stable viscosities at elevated temperatures and dry films of the products are more soluble than films prepared from untreated starch. Also, pastes of the modified cross-linked starch products are substantially-retrogradable. The modified cross-linked starch product is a partially depolymerized formaldehyde cross-linked starch product having a 60-minute Brabender viscosity of from about 70 to about 125 percent of the peak viscosity and a gel strength of less than 140 gm.-cm. Said product is prepared by treating starch granules with formaldehyde and partially depolymerizing the cross-linked starch granules.

---

In the art, there are many patents relating to preparing modified and cross-linked starch products.

Starches can be modified or thinned by acid hydrolysis, dextrinization, oxidation or generally any treatment which results in partial depolymerization of the molecule.

There are a number of reagents known to be capable of cross-linking starch. Exemplary of such reagents are formaldehyde, phosphorous oxychloride, acrolein, epichlorohydrin, crotonaldehyde, glyoxal, diglycidyl ether, cyanuric chloride, divinyl sulfone, meta-phosphates, phosgene and glycerol glycidyl ether.

In preparing a modified cross-linked starch product, it has been the general practice in the art to first modify native granular starch and then to cross-link it. This results in a number of distinct disadvantages. For instance, it involves two separate steps which in any manufacturing operation is costly and time consuming. Also, there is the possibility that the modified starch cannot be cross-linked to the extent necessary to obtain a product that has desirable paste stability. Moreover, if modified starch is not cross-linked sufficiently, retrogradation of pastes thereof may occur. Retrogradation involves a shifting of the straight-chain portion of the starch (amylose fraction) into parallel-arranged chains wherein hydrogen bonding locks together these chains into a permanent network. The physical manifestation of this phenomenon is a thickening of the paste into a gel of fairly great rigidity. Heat and agitation are not effective to destroy this network. Users of starch take great care to prevent or minimize retrogradation since if substantial retrogradation occurs the starch paste is no longer fluid and therefore cannot be used for sizing or coating applications.

Accordingly, it is the principal object of the present invention to provide a modified cross-linked starch product in the granular form which has a substantially stable paste viscosity at elevated temperatures.

It is a further object of the present invention to provide a modified cross-linked starch product in the granular form which when pasted does not substantially retrograde upon storage either at ambient or at elevated temperatures.

It is still a further object of the present invention to provide a modified cross-linked starch product in the granular form which when made into films has increased solubility.

These objects may be attained in accordance with the present invention by cross-linking native granular starch sufficiently so that when the same is subjected to starch gelatinization conditions the cross-linked starch granules will swell but will not completely gelatinize, and modifying the cross-linked starch, thereby obtaining a modified cross-linked starch product which when subjected to starch pasting conditions shows a 60-minute Brabender viscosity of from about 70 to about 125 percent of the peak viscosity and a gel strength of less than 140 gm.-cm.

In expressing the viscosity characteristics and the gel strength of the modified cross-linked starch product, it should be distinctly understood that the methods set forth below must be followed to determine the metes and bounds of the claimed invention, since a number of methods are known in the art for determining viscosities and gel strengths, and the numerical values obtained will vary significantly depending upon the exact method used.

METHOD FOR DETERMINING VISCOSITY

The viscosity of the cross-linked starch was determined using a Visco/Amylo/Graph manufactured by C. W. Brabender Instruments, Inc., South Hackensack, N.J. This instrument was standardized using a standard curve supplied by C. W. Brabender Instruments, Inc. 50 g. of the modified cross-linked starch is incorporated into about 450 ml. of water, mixed, and the pH of the mixture adjusted to 6.5 using a 2 percent NaOH solution. Sufficient water is added to the mixture to obtain a volume of 500 ml. and the mixture transferred into the Brabender cup. The stirring motor of the Visco/Amylo/Graph is actuated, and heat is applied until the mixture reaches 50° C. The Visco/Amylo/Graph is switched to automatic control which increases the temperature of the mixture at a rate of 1.5° C. per minute. The peak viscosity generally occurs at about 95° C. When there is no peak viscosity, the viscosity of the mixture when it reaches 95° C. is considered to be the peak viscosity. The mixture is held at 95° C. for 30 minutes. The viscosity at this point is the 60-minute Brabender viscosity. The viscosities are measured by using a 700 cm.-gm. cartridge and multiplying the chart reading by a factor 0.7 to obtain Brabender units.

METHOD FOR DETERMINING GEL STRENGTH

The gel strength is determined on the paste after the 60-minute Brabender viscosity has been determined. The paste is cooled to 25° F., stored for 24 hours and the gel strength then determined by the method described in the article entitled, "A Recording Gel Tester" by E. T. Hjermstad which appeared in Cereal Chemistry, Vol. XXXII, No. 3 (May 1955).

The term "starch" as used herein includes all raw starches such as raw corn, tapioca, potato, wheat, sago, arrowroot, rice, and the like, and various derivatives of starch such as starch esters, starch ethers, and the like, the only requirement being that the starch contains hydroxyl groups.

In order to obtain the modified cross-linked starch product of the present invention, either the starch must be modified and cross-linked in one step or the starch must be cross-linked and then modified.

The term "modified starch" used herein refers to any starch which has been subjected to a procedure or process which results in partial depolymerization of the starch molecule and includes acid hydrolysis, dextrinization and oxidation treatments. However, to prepare the modified cross-linked starch product of the present invention, it is preferred to use an acidic treatment to modify the starch.

The preferred cross-linking agent used in the present process is formaldehyde. Treatment with formaldehyde results in various parts of the starch molecule being linked together with —$CH_2$—, or methylene bridges. When the cross-linked starch is subjected to gelatinizing conditions, the characteristics of the resulting paste are substantially different from those of pastes of modified but not cross-linked starch. For instance, when an aqueous mixture of modified but not cross-linked starch is subjected to starch gelatinizing conditions, the viscosity of the paste will substantially increase until it reaches a maximum. This is known in the art as the peak viscosity. As the starch is maintained under elevated temperatures, the viscosity of the paste will decrease substantially. For example, the 60-minute Brabender viscosity of a paste of modified but not cross-linked starch may be from about 16 percent of the peak viscosity or even lower. Pastes of the modified cross-linked products of the present invention, on the other hand, have a stable viscosity. For example, the 60-minute Brabender viscosity of these starch pastes is from about 70 to about 125 percent of the peak viscosity.

The preferred modified cross-linked starch of the present invention has a 60-minute Brabender viscosity of from about 85 percent to about 110 percent of the peak viscosity. Also, the viscosity of pastes of the product will not significantly decrease upon storage at elevated temperatures. This characteristic is exceedingly important since users of starch, e.g., textile manufacturers, generally, make relatively large quantities of starch paste, and if the viscosity of the paste is not stable the user must continuously change his operating conditions in one way or another to compensate for the viscosity change. For instance, in applying sizing to yarn the textile manufacturer desires to obtain a uniform amount of starch solids on the yarn. If such manufacturer adjusts his equipment to accomplish this end while employing a starch paste of a certain viscosity and the viscosity changes, the equipment must be readjusted. This is, of course, undesirable. The viscosity of the pastes of the modified, cross-linked starch of the present invention is exceedingly stable and therefore no significant adjustment must be made while it is being used for sizing of textiles. The preferred use of the product of the present invention is as size for textiles.

The acid treatment of the starch may be performed simultaneously with the cross-linking reaction or after the cross-linking reaction. In order to perform the acid modification, sufficient acid must be added to the slurry to obtain a filtrate acidity of below about 2 normal. Typically, however, the filtrate acidity of the slurry will be adjusted to a range of from about 0.05 to about 0.30 normal and preferably to a range of from about 0.1 to about 0.2 normal.

It is a preferred embodiment of the invention to perform the cross-linking and modification reaction simultaneously. This may be achieved by forming an aqueous mixture of starch, incorporating formaldehyde into the mixture and acidifying the mixture to a filtrate acidity enumerated above. The time, temperature, acid concentration, the dry basis starch present and the amount of formaldehyde used are interdependent variables and changing any one of these can significantly affect the characteristics of the final product.

The aqueous mixture of starch may have a starch solids concentration of from about 10 percent to about 44 percent. It is preferred, however, that the aqueous mixture have a starch solids concentration of from about 28 to about 42 percent. In the case of formaldehyde, the amount added may vary from about 0.25 to about 4.6 percent based on the starch solids and preferably from about 0.27 to about 1.3 percent. Generally, paraformaldehyde is used because of the ease of handling the same.

The paraformaldehyde is simply added to the starch slurry and sufficient acid is added to obtain a filtrate acidity enumerated above. The higher the acidity the shorter the period necessary to obtain the desired degree of modification. Generally, however, the desired degree of cross-linking and modification is achieved in from about 10 to about 15 hours. The temperature at which the reactions are performed can vary widely, for instance from about 25° to 55° C. Preferably, however, the reaction will be carried out at a temperature of from about 50° to about 55° C. Of course, the exact conditions under which the reactions are performed must be such that the pastes of the products have a 60-minute Brabender viscosity of from about 70 to about 125 percent of the peak viscosity. Preferably, the conditions of the modification and cross-linking reactions are such that a 60-minute Brabender viscosity of from about 85 to about 110 percent of the peak viscosity is obtained.

Pastes of the modified cross-linked starch products are exceedingly stable in respect to retrogradation occurring. Eliminating or substantially preventing retrogradation is extremely important when starch pastes are used for sizing of textiles. The retrograded or gelled portion of those starch products usually used for sizing will form lumps and the lumps will be picked up by the yarn. The lumps persist through the slashing operation and cause breakage of the yarn when it is split and woven.

The degree to which a starch product may retrograde can be determined by measuring the gel strength of the product. Generally, the gel strength of the modified cross-linked starch products of the present invention will be less than about 140 gm.-cm., preferably less than about 100 gm.-cm. and most preferably less than about 80 gm.-cm.

In order to describe more clearly the nature of the present invention, specific examples will hereinafter be described. It should be understood, however, that this is done solely by way of example and is intended neither to delineate the scope of the invention nor limit the ambit of the appended claims.

EXAMPLE I

This example illustrates the effect of the period of modification on the viscosity characteristics of modified cross-linked starch products.

A slurry (23.32 liters) containing 35.54 percent by weight of untreated corn starch was heated to 129° F. and the pH of the slurry was adjusted to 8.3 with 165 ml. of a saturated sodium carbonate solution. Paraformaldehyde (1 percent by weight based on the dry starch) was added. At the end of one and one-half hours during which the paraformaldehyde dissolved, the pH of the slurry was adjusted to 2.2 by the addition of muriatic acid. The filtrate acidity was observed to be 0.007 normal. The slurry was stirred and the temperature of the slurry was maintained at 129° F. After 17 hours the acidity of the slurry was increased by the addition of 175 ml. of 20 Baumé muriatic acid. This increased the filtrate acidity of the slurry to 0.105 normal. Samples were removed after ¼, 13 and 24 hours of modification time. The samples were neutralized to a pH of 6 and filtered on a Buchner filter. The cakes were washed with one cake volume of water and then dried in a laboratory model Proctor & Schwartz forced air drier at an air temperature of 190° F.

The peak viscosity of pastes of the samples and the 60-minute Brabender viscosity are shown in Table I below.

TABLE I

| Modification time | Peak viscosity Brabender units | 60-minute viscosity Brabender units | Ratio of 60-minute viscosity to peak viscosity (percent) |
|---|---|---|---|
| ¼ hour | 1,645 | 1,432 | 87 |
| 13 hours | 595 | 735 | 123 |
| 24 hours | 252 | 238 | 94 |

From the above table it is seen that a modification time of 24 hours resulted in a modified cross-linked starch with the most stable paste viscosity.

EXAMPLE II

This example illustrates the effect of using various proportions of formaldehyde on the viscosity characteristics of modified cross-linked starch products.

Slurries containing 35.54 percent by weight dry basis untreated corn starch were placed in each of 3 vessels and maintained under constant stirring. Each vessel contained 6 liters of slurry. The temperature of the slurries was maintained at 129° F. and the pH of the slurries was adjusted to 8.3 with a sodium carbonate solution. Various amounts of paraformaldehyde were added to the slurries and allowed to dissolve. Each of the slurries was acidified with 125 ml. of muriatic acid which resulted in a filtrate acidity of 0.247 normal. Periodically, one of the slurries was neutralized to a pH of 6, the starch filtered off, washed on the filter and dried in a laboratory Proctor & Schwartz drier at an air temperature of 175° F. The peak viscosities and the 60-minute Brabender viscosities of pastes of the samples were determined and are shown in Table II below.

TABLE II

| Sample | Paraformaldehyde concentration (percent based on starch) | Reaction time (hours) | Peak viscosity (Brabender units) | 60-minute viscosity (Brabender units) | Ratio of 60-minute viscosity to peak viscosity (percent) |
|---|---|---|---|---|---|
| A | 0 | 3.5 | 81 | 11 | 14 |
| B | 0.3 | 5.0 | 249 | 126 | 51 |
| C | 1.0 | 12.75 | 231 | 228 | 99 |

From the above table, it is seen that under the reaction conditions of the example, 1 percent formaldehyde was necessary to obtain a modified cross-linked starch of good paste stability.

After determination of the 60-minute viscosity, the samples were stored at 25° C. for 24 hours and the gel strength of the samples was determined by the method described in the article entitled, "A Recording Gel Tester" by E. T. Hjermstad which appeared in Cereal Chemistry, Vol. XXXII, No. 3 (May, 1955).

Sample: Gel strength (gm.-cm.)
A _____ 267
B _____ 76
C _____ 19

The higher the gel strength of the samples the greater the degree of retrogradation which occurred. From the above it is apparent that Sample C did not have a tendency to retrograde.

EXAMPLE III

This example illustrates the effect of the sequence of steps used in preparing modified cross-linked starch products on the characteristics of pastes prepared from such starch products.

To a starch slurry containing 39 percent by weight dry basis starch at 129° F. was added sufficient muriatic acid to obtain a filtrate acidity of 0.05 normal. After 15 hours the slurry was neutralized to a pH of 5.5.

Six liters of this slurry, containing 35.54 percent by weight dry basis starch, were placed in each of 3 vessels equipped with stirrers. The temperature of the slurries was maintained at 129° F. Paraformaldehyde was added to each slurry to provide concentrations of 1, 2 and 4 percent by weight based on the dry basis starch. The pH of the slurries was adjusted to 1.55 with muriatic acid. Periodically, samples were taken from each slurry. These samples were neutralized using a sodium carbonate solution to a pH of 6 and filtered. The filter cakes were washed on the filter and dried in the laboratory Proctor & Schwartz drier at an air temperature of 200° F.

The peak viscosities, the 60-minute Brabender viscosities and the gel strengths of pastes of the samples were determined and are shown in Table III below.

TABLE III

| Sample | Percent paraformaldehyde | Reaction time (hours) | Peak viscosities at 95° C. (Brabender units) | 60-minute viscosities (Brabender units) | Ratio of 60-minute viscosity to peak viscosity (percent) | Gel strength (gm.-cm.) |
|---|---|---|---|---|---|---|
| A | 1 | 1 | 148 | 24 | 16 | 458 |
| B | 1 | 4 | 281 | 115 | 41 | 526 |
| C | 1 | 22 | 539 | 427 | 79 | 308 |
| D | 2 | 1.25 | 158 | 28 | 18 | 532 |
| E | 2 | 4 | 504 | 284 | 56 | 446 |
| F | 2 | 22 | (¹) | 665 | ---------- | 222 |
| G | 4 | 1.25 | 255 | 63 | 25 | 550 |
| H | 4 | 4 | 777 | 592 | 26 | 412 |
| I | 4 | 21 | (¹) | 172 | ---------- | 16 |

¹ Not determined.

From the above table it is seen that although Sample B had the viscosity stability of the products of the present invention, this product had a gel strength which was too high. Sample I, which had a low gel strength, did not have the required viscosity stability.

EXAMPLE IV

This example illustrates the preparation of a modified cross-linked starch using a cationic starch.

Six liters of a starch slurry containing 35.54 percent by weight dry basis corn starch were placed in a vessel and heated to 120° F. While stirring the slurry a caustic-salt solution (1.65 normal in base) was added to provide 0.134 normal in base with respect to the slurry. Diethylamino ethyl chloride (2 percent by weight based on the dry starch), technical grade, was added to the slurry and allowed to react with the starch for 16 hours.

The pH of the slurry was then adjusted with muriatic acid to 1.5, and 1 percent paraformaldehyde by weight based on the dry starch was added. The slurry was then acidified with muriatic acid to obtain a filtrate acidity of 0.245 normal. Samples were removed periodically, neutralized to pH 5.8–6.0 with a sodium carbonate solution and filtered. The filter cakes were washed with one cake volume of water and dried in a laboratory model Proctor & Schwartz drier at an air temperature of 200° F.

The peak viscosities, the 60-minute Brabender viscosities and the gel strengths of pastes of the samples were measured and are shown in Table IV below.

TABLE IV

| Sample | Reaction time (hours) | Peak viscosity at 95° C. (Brabender units) | 60-minute viscosity (Brabender units) | Ratio of 60-minute viscosity to peak viscosity (percent) | Gel strength (gm.-cm.) |
|---|---|---|---|---|---|
| A | 1.5 | (¹) | 1,229 | ---------- | 275 |
| B | 4.5 | 924 | 1,022 | 111 | 100 |
| C | 6.0 | 567 | 602 | 106 | 35 |
| D | 23.5 | 336 | 287 | 85 | 29 |

¹ Too thick to measure.

The above table shows that a cationic starch may be used to prepare the modified cross-linked starch of the present invention. Sample A did not have suitable paste characteristics because of the very short reaction time employed.

Other starch derivatives such as cyanoethylated starches and hydroxyethyl starches may be used to prepare the modified cross-linked starches of the present invention.

EXAMPLE V

This example illustrates the improved solubility characteristics of the modified cross-linked starch products of the present invention.

Starch slurries were prepared containing 39 percent by weight dry basis starch, heated to 129° F. and sufficient muriatic acid added to obtain therein a filtrate acidity of 0.05 normal. One of the slurries after a reaction time of 6 hours was neutralized to a pH of 5.5 and another slurry was neutralized after a reaction time of 10 hours. The slurries of the acid modified starches were filtered and the starch cakes washed and dried in a Proctor & Schwartz drier at an air temperature of 200° F.

The water and enzyme solubilities of films prepared from the two acid-modified starches were compared with the water and enzyme solubilities of films prepared from Sample C of Example III and Sample C of Example II.

The films were prepared in the following manner:

The samples were subjected to gelatinizing conditions at a solids concentration of 10 percent at a pH of 6.5 for 60 minutes and the pastes were cast on glass plates. The pastes were dried at ambient conditions. The dry films were ground to pass a 40 mesh U.S. Standard Sieve.

The water and alpha-amylase solubilities of the films were determined by the following method:

2 g. of the dried, ground film were placed in sufficient water to obtain 100 g. total weight and maintained for 30 minutes at 76.7° C. with gentle agitation. The mixtures were then centrifuged for 15 minutes at 1800 r.p.m. and the supernatant analyzed for starch solids to determine the percent soluble starch. The same procedure was used to determine the enzyme solubility of the samples except that sufficient VANZYME 31 (alpha-amylase preparation) was added to the solution to obtain therein 0.00625 g. of VANZYME 31 per 100 ml. of solution.

TABLE V

| | Solubility (percent soluble) | |
|---|---|---|
| | Water | Alpha-amylase [1] |
| Sample: | | |
| Acid modified for 6 hours | 26.6 | 89.9 |
| Acid modified for 10 hours | 31.4 | 89.2 |
| Sample C in Table III | 30.2 | 88.0 |
| Sample C in Table II | 55.4 | 103.8 |

[1] The maximum solubility is greater than 100 percent due to extensive hydrolysis of the starch and the chemical addition of water to the fragments.

From the above table it is seen that a modified cross-linked starch of the present invention (Sample C from Example II) had substantially higher water and enzyme solubilities than the other starch samples.

The terms and expressions which have been employed are used as terms of description and not of limitation, and and it is not intended in the use of such terms and expressions to exclude any equivalents of the features shown and described.

What is claimed is:

1. A partially depolymerized formaldehyde cross-linked starch product having a 60-minute Brabender viscosity of from about 70 to about 125 percent of the peak viscosity and a gel strength of less than 140 gm.-cm.

2. A partially depolymerized formaldehyde cross-linked starch product as defined in claim 1, wherein the starch product has a 60-minute Brabender viscosity of from about 85 to about 110 percent of the peak viscosity.

3. A partially depolymerized formaldehyde cross-linked starch product as defined in claim 1, wherein the starch product has a gel strength of less than 100 gm.-cm.

4. A partially depolymerized formaldehyde cross-linked starch product as defined in claim 2, wherein the starch product has a gel strength of less than 100 gm.-cm.

5. A partially depolymerized formaldehyde cross-linked starch product as defined in claim 4, wherein the starch product has a gel strength of less than 80 gm.-cm.

6. A partially depolymerized formaldehyde cross-linked starch product as defined in claim 3, wherein the starch product is partially depolymerized by an acid treatment.

7. A partially depolymerized formaldehyde cross-linked starch product as defined in claim 4, wherein the starch product is partially depolymerized by an acid treatment.

8. A partially depolymerized formaldehyde cross-linked starch product as defined in claim 5, wherein the starch product is partially depolymerized by an acid treatment.

9. A textile sizing agent comprising water and a partially depolymerized formaldehyde cross-linked starch product having a 60-minute Brabender viscosity of from about 70 to about 125 percent of the peak viscosity and a gel strength of less than 140 gm.-cm.

10. A textile sizing agent as defined in claim 9, comprising a partially depolymerided formaldehyde cross-linked starch product having a 60-minute Brabender viscosity of from about 85 to about 110 percent of the peak viscosity.

11. A textile sizing agent as defined in claim 10, wherein the partially depolymerized formaldehyde cross-linked starch product has a gel strength of less than 100 gm.-cm.

12. A textile sizing agent as defined in claim 11, wherein the starch product is partially depolymerized by an acid treatment.

13. A method of preparing a partially depolymerized formaldehyde cross-linked starch product comprising treating starch granules with formaldehyde to effect cross-linking in the starch granules to the extent that when the cross-linked starch granules are subjected to gelatinization conditions the starch granules will swell but will not completely gelatinize and partially depolymerizing the cross-linked starch granules, the conditions under which cross-linking and depolymerization are carried out being such to produce a partially depolymerized cross-linked starch product having a 60-minute Brabender viscosity of from about 70 to about 125 percent of the peak viscosity and a gel strength of less than 140 gm.-cm.

14. A method of preparing a partially depolymerized formaldehyde cross-linked starch product as defined in claim 13, wherein the starch granules are partially depolymerized by an acid treatment.

15. A method of preparing a partially depolymerized formaldehyde cross-linked starch product as defined in claim 14, wherein the starch granules are cross-linked and partially depolymerized simultaneously.

16. A method of preparing a partially depolymerized formaldehyde cross-linked starch product as defined in claim 15, wherein the starch granules are treated with formaldehyde while the starch granules are in an aqueous slurry and there is incorporated into the aqueous slurry a sufficient amount of an acid to obtain a filtrate acidity of below about 2 normal.

17. A method of preparing a partially depolymerized formaldehyde cross-linked starch product as defined in claim 16, wherein there is incorporated into the aqueous slurry a sufficient amount of an acid to obtain a filtrate acidity of from about 0.05 to about 0.30 normal.

18. A method of preparing a partially depolymerized formaldehyde cross-linked starch product as defined in claim 17, wherein there is incorporated into the aqueous slurry a sufficient amount of an acid to obtain a filtrate acidity of from about 0.1 to about 0.2 normal.

19. A method of preparing a partially depolymerized formaldehyde cross-linked starch product as defined in claim 17, wherein the temperature of the slurry during cross-linking and depolymerization is from about 25° to about 55° C.

20. A method of preparing a partially depolymerized formaldehyde cross-linked starch product as defined in claim 19, wherein the temperature of the slurry during cross-linking and depolymerization is from about 50° to about 55° C.

References Cited

UNITED STATES PATENTS

| | | | |
|---|---|---|---|
| 2,113,034 | 4/1938 | Rowland et al. | 260—233.3 |
| 2,417,611 | 3/1947 | Pierson | 260—209 |
| 2,805,220 | 9/1957 | Gerwitz | 260—233.3 |
| 2,977,356 | 3/1961 | Commerford et al. | 260—233.3 |
| 3,065,222 | 11/1962 | Bullock et al. | 260—233.3 |
| 3,086,971 | 4/1963 | Trimnell et al. | 260—233.3 |
| 3,278,522 | 10/1966 | Goldstein et al. | 260—233.3 |
| 3,317,346 | 5/1967 | Kibbel et al. | 127—70 |
| 3,238,193 | 3/1966 | Tuschhoff et al. | 260—233.5 |
| 3,376,287 | 4/1968 | Jarowenko et al. | 260—233.5 |
| 3,438,913 | 4/1969 | Hjermstad | 260—17.3 |
| 3,519,618 | 7/1970 | Parmerter | 260—233.3 |
| 3,549,618 | 12/1970 | Speakman | 260—233.3 |
| 3,553,194 | 1/1971 | Verbanac et al. | 260—233.5 |

DONALD E. CZAJA, Primary Examiner

M. I. MARQUIS, Assistant Examiner

U.S. Cl. X.R.

117—139.5 C; 260—233.3 A, 233.3 R, 233.5

UNITED STATES PATENT OFFICE
CERTIFICATE OF CORRECTION

Patent No. 3,705,046                                Dated December 5, 1972

Inventor(s)  Edwin L. Speakman

It is certified that error appears in the above-identified patent and that said Letters Patent are hereby corrected as shown below:

In the Abstract of the Disclosure, Column 1, the sentence beginning on line 16 should read: "Also, pastes of the modified cross-linked starch products are substantially non-retrogradable."

Column 8, line 24, "depolymerided" should read --depolymerized--.

Signed and sealed this 1st day of May 1973.

(SEAL)
Attest:

EDWARD M. FLETCHER, JR.                ROBERT GOTTSCHALK
Attesting Officer                      Commissioner of Patents